United States Patent [19]

Hambly

[11] 4,384,773
[45] May 24, 1983

[54] DIGITAL LIGHT-TO-FREQUENCY CONVERTER WITH PRESET VOLTAGE

[75] Inventor: Warren E. Hambly, West Bridgewater, Mass.

[73] Assignee: Polaroid Corporation, Cambridge, Mass.

[21] Appl. No.: 299,844

[22] Filed: Sep. 8, 1981

[51] Int. Cl.³ .............................................. G03B 7/097
[52] U.S. Cl. ........................................ 354/29; 354/51
[58] Field of Search .................................. 354/29, 51

[56] References Cited

U.S. PATENT DOCUMENTS

4,293,208 10/1981 Bagdis .................................. 354/29

Primary Examiner—Michael L. Gellner
Attorney, Agent, or Firm—Edward S. Roman

[57] ABSTRACT

A digital scene light detecting and integrating circuit is provided with an automatic preset by which the integrating circuit is presignaled to ramp upward to a preselected reference voltage value at which digital pulse counting can immediately begin, thereby subsequently enabling the precise detection and integration of illumination.

22 Claims, 7 Drawing Figures

DIGITAL LIGHT-TO-FREQUENCY CONVERTER WITH PRESET VOLTAGE

BACKGROUND OF THE INVENTION

1. Field of the Invention

This invention relates generally to a photographic exposure control system having a preset digital light integrator and, more particularly, to a photographic exposure control system having a digital light integrator which is preset prior to exposure to assure an accurate first light detect at the commencement of the exposure interval.

2. Description of the Prior Art

In the photographic art, exposure control systems embodying scanning shutter blade elements which operate to vary exposure aperture areas with time during the exposure interval are well known as indicated by U.S. Pat. No. 3,942,183, entitled "Camera with Pivoting Blades", by George D. Whiteside, issued Mar. 2, 1976, in common assignment herewith. Such scanning shutter blade mechanisms generally include a pair of counter-reciprocating shutter blade elements each having a primary aperture that traverses the optical axis of the camera during the exposure interval. The primary apertures are shaped so that upon overlying one another during countermovement of the blades, there is defined an effective exposure aperture value which increases to a maximum value in a determinate period of time.

Exposure control is generally provided by a pair of secondary photocell apertures in respective shutter blade elements which admit scene light to a photoresponsive element in correspondence with the scene light admitted to the focal plane during shutter blade movement through an exposure cycle. The output from the photoresponsive element is directed to an integrator circuit which triggers upon reaching an integration level corresponding to a desired exposure value to terminate the exposure interval by returning the shutter blade elements back to their initial scene light blocking position.

Shutter mechanisms of the aforementioned type are often arranged to operate in synchronism with a source of artificial illumination such as an electronic flash or strobe. The shutter mechanism and strobe are generally arranged to operate in either a high ambient scene light intensity mode of operation where no artificial illumination is provided or a low ambient scene light intensity mode of operation where the strobe is fired to provide a source of artificial illumination. Under conditions of low ambient scene light intensity where the strobe is expected to be fired, the scanning shutter blade mechanism may be stopped at an aperture value corresponding to the camera-to-subject distance as determined by focusing the objective lens. Systems of the aforementioned type are generally referred to as "follow focus" systems and the maximum aperture to which the scanning shutter blade elements are allowed to open is controlled by the rangefinding or focusing system of the camera in a manner as is more fully disclosed in U.S. Pat. No. 3,977,014, entitled "Follow Focus Exposure Control System with Improved Uniform Trim Control", by Philip R. Norris, issued Aug. 24, 1976, in common assignment herewith.

Such a system need not actually stop the opening shutter blade movement at a maximum effective exposure aperture as determined by the rangefinding or focusing system of the camera, but may instead vary the time at which the strobe light is fired during the opening shutter blade movement as determined in correspondence with the rangefinding or focusing system of the camera. Since the duration of the strobe light is short in comparison with the time required for the shutter blade mechanism to scan from its scene light blocking position to its maximum exposure aperture defining position, the aperture defined by the shutter blade elements at the instant of strobe firing for practical purposes constitutes the effective aperture by which the exposure occurs. Such a system is more fully described in U.S. Pat. No. 3,478,660, entitled "Photographic Apparatus with Flash Exposure Control System", by Edwin H. Land, issued Nov. 18, 1969, in common assignment herewith.

Range responsive flash fire systems of the aforementioned type can also be utilized in conjunction with sonar ranging devices as is more fully described in U.S. Pat. No. 4,188,103, entitled "Range Synchronized Flash Photographic Apparatus and Method for Achieving Optimum Flash Exposure", by Conrad H. Biber et al., issued Feb. 12, 1980, in common assignment herewith. In the aforementioned system, means must be provided for synchronizing the instant at which the scene light is first admitted to the film plane at the commencement of the exposure interval to the transmission of the sonar ranging signal in order to control the strobe fire time at the appropriate aperture. Such a system for firing a flash as a function of a sonar determined ranging signal is also disclosed in U.S. Pat. No. 4,192,587, entitled "Proportional Fill Flash", by Arthur G. LaRocque et al., issued Mar. 11, 1980, in common assignment herewith and now incorporated by reference herein in its entirety. An LED in combination with first light detect apertures in the shutter blade mechanism operate to synchronize the transmission of light from the LED to a photocell in correspondence with the instant that scene light is first admitted by the primary apertures in the shutter blades at the commencement of the exposure interval. Such systems, however, generally have not embodied digital scene light integrating techniques which require extended integration lead times for the integration levels to come within required operating voltage ranges before digital pulse counting can begin. This extended integration lead time may thus introduce an error in the precise detection of the instant that scene light is first admitted to the film plane at the commencement of the exposure interval so as to subsequently cause an error in the time at which the flash is fired thereby causing the flash to be fired at an aperture value which might not be properly correlated to the camera-to-subject range. Other types of scene light measurement such as the pre-exposure measurement of ambient scene light must also be made in a precise manner without the error that might otherwise result from an extended integration lead time.

One satisfactory solution toward this problem as disclosed in U.S. patent application Ser. No. 198,781, entitled "Prebias for Digital Light Integrator", utilizes an arrangement for prebiasing the light integrator to provide an output therefrom within an operative range of voltages immediately prior to the detection of first light at the commencement of the exposure interval in order to eliminate any potential errors which might otherwise result in the detection of first light at the commencement of the exposure interval or in any other scene related measurement resulting from the integration lead time required for the digital type of light integrating arrangement to reach its operative range of voltages. Such a system although generally satisfactory for most applications may still not be accurate enough for some applications wherein it becomes necessary not only to commence the scene light integration from within an operative range of voltages but instead to commence the scene light integration from a precise voltage within the operative range of voltages in order to eliminate the possibility of missing even a single pulse count by the digital scene light integration counter.

Therefore, it is a primary object of this invention to provide a means for presetting a digital scene light integrator at a precise voltage immediately prior to its integration of scene light in order to assure that the subsequent integration of scene light be accurate even to within a single pulse count.

It is a further object of this invention to preset a digital scene light integrator prior to the actual integration of scene light without prebiasing the scene light detector.

Other objects of the invention will be in part obvious and will in part appear hereinafter. The invention accordingly comprises a mechanism and system possessing a construction, combination of elements and arrangement of parts which are exemplified in the following detailed disclosure.

SUMMARY OF THE INVENTION

An illumination detecting and integrating circuit comprises detecting means responsive to the incidence of illumination for providing an output signal having an electrical characteristic which varies as a function of the intensity of the incident illumination thereon. Means are provided for integrating the output signal from the detecting means and for providing an output signal which progressively increases in correspondence with the integrated value of the output signal from the detecting means. Selectively actuatable preset means provide an input signal to the integrating means prior to the incidence of illumination to the detecting means in order to enable the integrating means to provide a precisely increasing output signal. The preset means thereafter responds to the progressively increasing output signal from the integrating means reaching a select value by changing its output signal to the integrating means so as to maintain the output signal from the integrating means at substantially the select value until illumination impinges upon the detecting means.

The illumination detecting and integrating means of this invention when utilized in a photographic camera apparatus include preset means which are actuated in concert with the actuation of the camera to initiate a photographic cycle and which are subsequently disabled immediately prior to the commencement of the photographic exposure interval. The preset means preferably comprises a current amplifier which includes a current sink wherein the input signal to the integrating means from the preset means prior to the output signal from the integrating means reaching the select value corresponds generally to the current drawn by the current sink. The detecting means preferably comprises a photoresponsive element having a current flow therethrough prior to the incidence of illumination thereon. The current amplifier additionally includes a modulated current source for providing a substantially canceling current to the current flow from the photoresponsive element subsequent to the output signal from the integrating means reaching the selected value.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENTS

Referring now to FIGS. 1 through 4, there are shown generally at 10 a photographic exposure control shutter apparatus disposed about a baseblock casting 12 which can be selectively machined to support the various components of a photographic exposure control mechanism. Centrally disposed within the baseblock casting 12, there is provided a light entry exposure opening 14 which defines the maximum available exposure aperture for the system. An objective or taking lens (not shown) can be provided in overlying relation with respect to the light entry opening 14. Image carrying light rays from the objective lens which are transmitted by the shutter apparatus 10 in a manner to be subsequently described are thereafter directed to a rearwardly positioned film plane (not shown) by way of a reflecting mirror (also not shown) all of which are stationed within a suitable lighttight film exposure chamber (also not shown) in a manner as is more fully described in U.S. Pat. No. 4,040,072, entitled "Shutter Latch Arrangement Releasable Through Shutter Blade Actuation and Resettable Through Film Advancement", B. Johnson et al., issued Aug. 2, 1977, in common assignment and now incorporated by reference herein.

The exposure control shutter apparatus 10 comprises two overlapping shutter blade elements 16 and 18 of the so-called "scanning type" which will be subsequently described in greater detail herein. A pair of scene light admitting primary apertures 20 and 22 are provided, respectively, in the blade elements 16 and 18 to cooperatively define a progressive variation of effective aperture openings in accordance with simultaneous longitudinal and lateral displacement of one blade element with respect to the other blade element in a manner as is fully described in U.S. Pat. No. 3,942,183, entitled "Camera With Pivoting Blades", by G. Whiteside, issued Mar. 2, 1977, in common assignment herewith and now incorporated by reference herein. The apertures 20 and 22 are selectively fitted so as to overlap the light entry exposure opening 14 thereby defining a gradually varying effective aperture size as a function of the position of the blade elements 16 and 18.

Each of the blades 16 and 18 may additionally be configured to have corresponding photocell sweep secondary apertures shown, respectively, at 24 and 26. The photocell sweep secondary apertures 24 and 26 may be configured to track in a predetermined corresponding relationship with respect to the scene light admitting primary apertures 20 and 22. As is readily apparent, the photocell sweep secondary apertures 24 and 26 move in the same manner as the primary apertures 20 and 22 to define a small secondary effective aperture for admitting the passage of scene light transmitted to a photoresponsive element 62 (see FIG. 5) from the scene being photographed. The blades 16 and 18 also include, respectively, a third pair of first light detect apertures 30 and 32 which operate in a manner to be subsequently described to admit light from a source of artificial illumination such as an LED 33, as also shown in the circuit diagram of FIG. 5, to the photoresponsive element 62 in coincidence with the first scene light admitted to the film plane when the primary apertures 20 and 22 initially overlap at the commencement of an exposure interval.

Projecting from the baseblock casting 12 at a location spaced laterally apart from the light entry exposure opening 14 is a pivot pin or stud 34 which pivotally and translatably engages elongate slots 36 and 38 formed in respective shutter blade elements 16 and 18. Pin 34 may be integrally formed with the baseblock casting 12 and blade elements 16 and 18 may be retained in engaging relation with respect to the pin 34 by any suitable means such as peening over the outside end of the pin 34.

The opposite ends of the blade elements 16 and 18 respectively include extended portions which pivotally connect to a walking beam 40. The walking beam 40, in turn, is disposed for rotation relative to the baseblock casting 12 by pivotal connection to a projecting pivot pin or stud 42 which may be integrally formed with the baseblock casting 12 at a location spaced laterally apart from the light entry exposure opening 14. The walking beam 40 may be pivotally retained with respect to the pin 42 by any conventional means such as an E ring (not shown). In the preferred mode, the walking beam 40 is pivotally connected at its distal ends to the shutter blade elements 16 and 18 by respective pin members 44 and 46 which extend laterally outward from the walking beam 40. Pin members 44 and 46 are preferably circular in cross-section and extend through respective circular openings in respective shutter blade elements 16 and 18. Thus, the shutter blade elements 16 and 18 provide a blade mechanism with the means for mounting the blade mechanism for movement being provided by the walking beam 40 together with the pivot pin 34.

Drive means are provided for displacing the blade mechanism and include a tractive electromagnetic device in the form of a solenoid 48 employed to displace the shutter blades 16 and 18 with respect to each other and the baseblock casting 12. A solenoid 48 includes an internally disposed cylindrical plunger unit 50 which retracts inwardly into the body of the solenoid upon energization of the solenoid winding. A solenoid plunger 50 includes an end cap 52 at the outside end thereof together with a vertical slot or groove 54 within the end cap for loosely engaging a pin 56 extending outwardly from the walking beam 40. In this manner, the solenoid plunger 50 is affixed to the walking beam 40 so that longitudinal displacement of the plunger 50 will operate to rotate the walking beam about the pivot pin 40 so as to appropriately displace the shutter blades 16 and 18. The drive means may additionally include a helical compression spring 58 around the plunger 50 so as to continuously urge the end cap 52 outwardly of the solenoid 48, thereby also continuously urging the blade elements 16 and 18 into positions defining the largest effective primary aperture over the light entry exposure opening 14. As will be readily understood, in some shutter blade arrangements it may be preferable to utilize a tension spring in place of the compression spring 58 in a manner as is shown in U.S. Pat. No. 3,942,183, supra. Thus, with the spring connection herein described, the exposure control blade apparatus 10 is biased to continuously urge the shutter blade elements 16 and 18 into an open scene light unblocking orientation as shown in FIG. 4.

Figure 1:
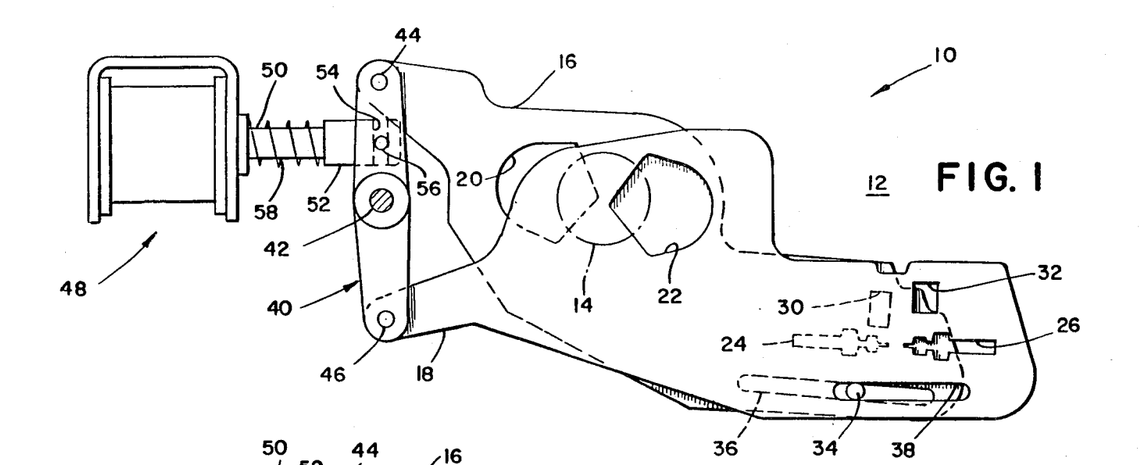
FIG. 1 is a front elevational view of the shutter blade mechanism of this invention.
Figure 2:
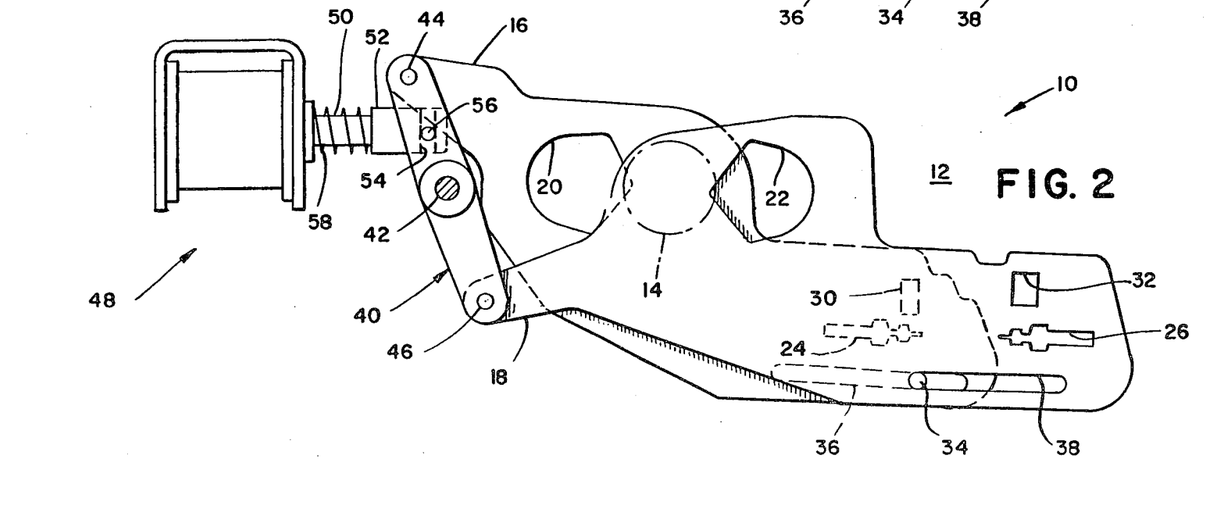
FIG. 2 is a front elevational view of the shutter blade mechanism of FIG. 1 at a different position from that of FIG. 1.
Figure 4:
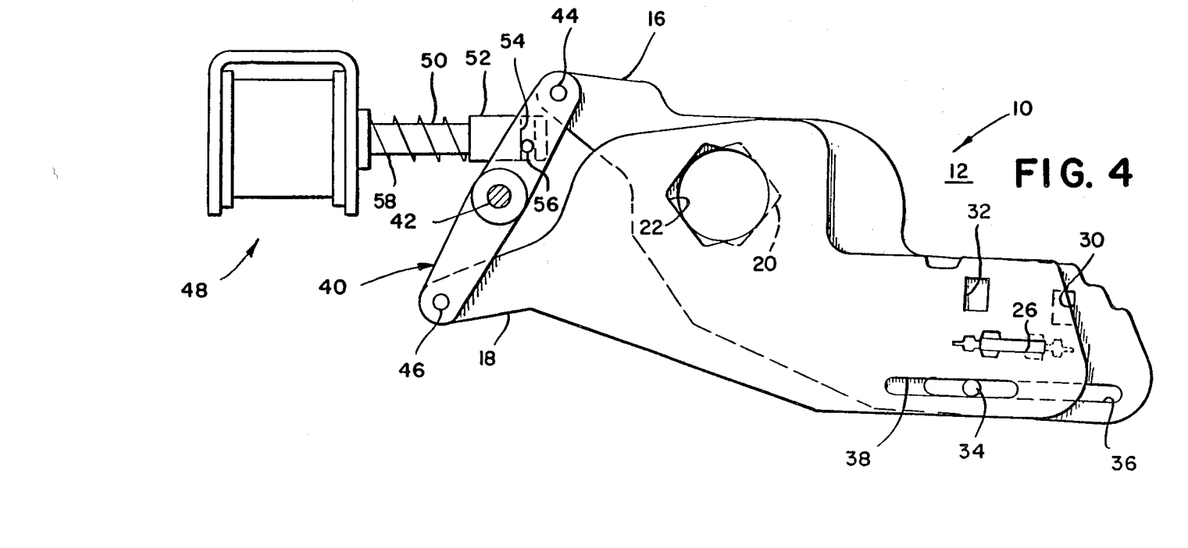
FIG. 4 is a front elevational view of the shutter blade mechanism of FIG. 1 in still another position from that of FIGS. 1, 2, and 3.

In the present arrangement, the shutter blades 16 and 18 are drawn from their scene light unblocking open arrangement as shown in FIG. 4 to their scene light blocking closed arrangement as shown in FIGS. 1 and 2 when the solenoid 48 is energized. Consequently, energization of the solenoid 48 prevents the shutter blades 16 and 18 from moving towards their maximum effective primary aperture defining arrangement under the urging of compression spring 58. However, it should be readily understood that the exposure control system of this invention would be equally applicable to photographic systems where the blades 16 and 18 are spring biased in a normally closed position. However, since in the preferred embodiment the shutter blade elements 16 and 18 are spring biased to move toward their scene light unblocking arrangement, it would otherwise be necessary to maintain the solenoid in a state of continued energization in order to hold the shutter blade elements 16 and 18 in their scene light blocking arrangement as shown in FIG. 1. Such continued energization of the solenoid 48, however, would present an intolerable power drain on the camera battery, particularly if the solenoid 48 had to be continuously energized even when the camera apparatus were not in use. In order to avoid this continued energization of the solenoid 46, there is provided a latch mechanism (not shown) which operates normally to latch the shutter blade mechanism in its scene light blocking arrangement as shown in FIG. 1 and which automatically unlatches the shutter blade mechanism to permit the shutter blade elements 16 and 18 to be moved to their scene light unblocking arrangement as shown at FIG. 4 in order to commence a photographic exposure cycle and which further automatically responds at the termination of an exposure cycle to relatch the blade elements 16 and 18 in their scene light blocking arrangement so as to permit deenergization of the solenoid 48. The manner in which the aforementioned latch operates is more fully described in U.S. Pat. No. 4,040,072, supra.

Figure 5:
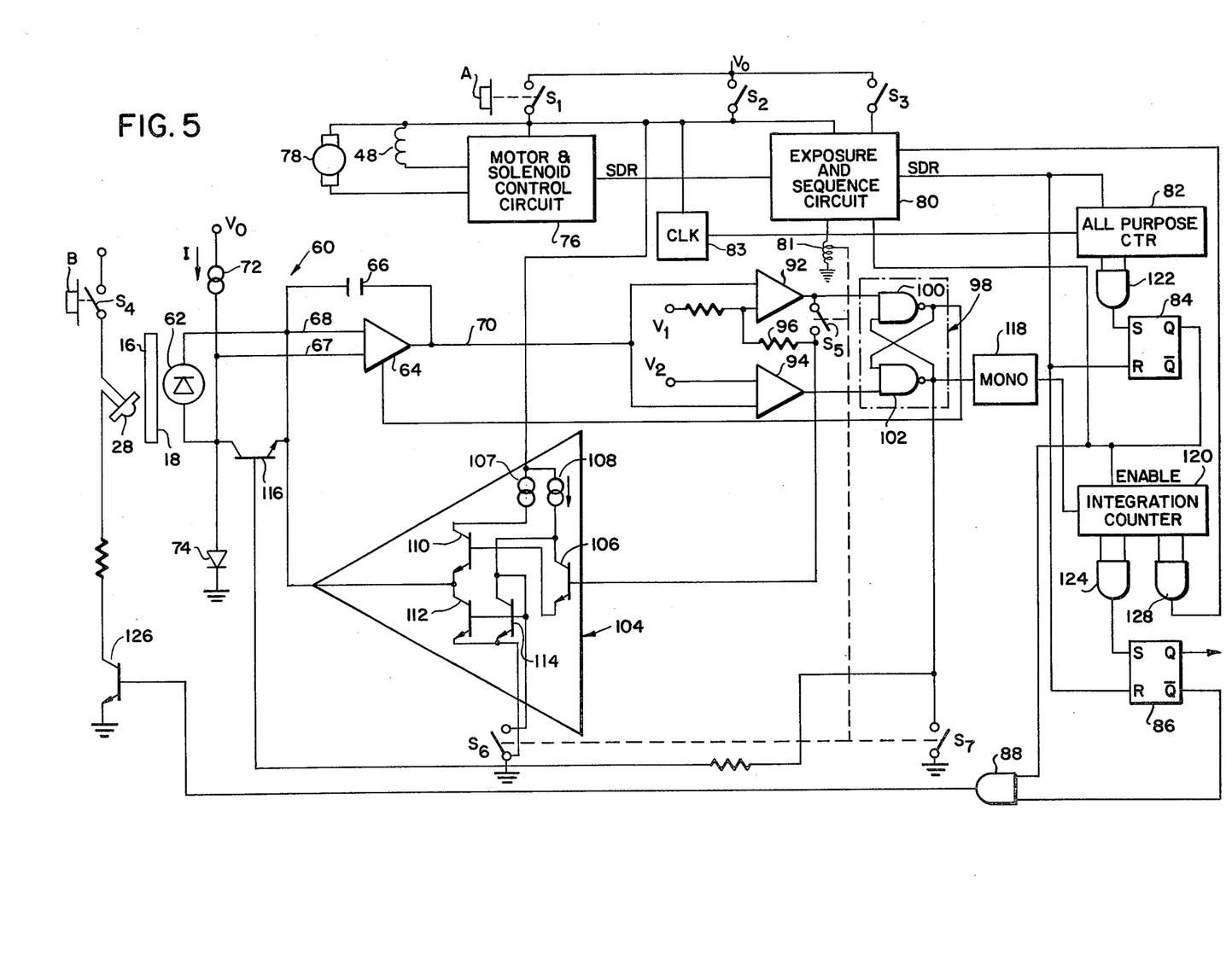
FIG. 5 is an electrical schematic view of a preferred embodiment for the preset digital light integrator system of this invention.

Referring now to FIG. 5, there is shown a schematic wiring diagram of one preferred embodiment for an exposure control circuit having the positively preset digital scene light integrator of this invention which operates in a manner now to be described. As shown generally at 60, there is provided a scene light detecting and integrating circuit comprising the photoresponsive element 62 connected across the input terminals 67, 68 of an operational amplifier 64 of the differential variety.

When considered ideally, the amplifier 64 has an infinite gain and an infinite input impedance and a zero output impedance. The input circuit of the amplifier 64, however, is structured such that the apparent input impedance for the photoresponsive element 62 is substantially zero, thereby functioning in a manner which permits the photoresponsive element 62 to operate in a current mode. Consequently, the current generated by the photoresponsive element 62 is limited substantially only to its own internal impedance. To accomplish this effect, a feedback integration capacitor 66 is connected between one input terminal 68 of the operational amplifier 64 and an output terminal 70 of the operational amplifier 64. In addition, the anode of the photoresponsive element 62 is connected to receive current from a constant current source 72 which is grounded by way of a diode 74.

With the integration feedback arrangement herein described, any difference of potential supplied by the photoresponsive element 62 across the input terminals 67 and 68 will operate to cause a current of opposite polarity to be produced through feedback integration capacitor 66. As a consequence, the feedback integration capacitor 66 provides a substantially instantaneous feedback signal of opposite polarity which serves to counteract any differential signal voltage impressed by the photoresponsive element 62 across the input terminals 67 and 68. Thus, although the amplifier 64 has a very high input impedance, the photoresponsive element 62, when connected in the aforementioned manner, experiences only a very low input impedance to the amplifier 64. Therefore, the current output of the photoresponsive element 62 is directed into the feedback integration capacitor 66. In this manner, the photoresponsive element 62 is connected to operate in a constant current mode of operation under conditions of nonvarying scene light intensity to provide a substantially linear output response at output terminal 70 as is more fully described in U.S. Pat. No. 3,620,143, entitled "Automatic Exposure Control System with Fast Linear Response", by J. P. Burgarella, issued Nov. 16, 1971, in common assignment herewith and now incorporated by reference herein in its entirety.

The exposure control circuitry herein described preferably derives power from a battery that is insertable within the camera in correspondence with a film pack or cassette in a manner as is well known in the art for Polaroid SX-70 type film cassettes in cameras. The aforementioned film cassette battery is preferably utilized to power the circuitry in FIG. 5 in its entirety by way of three switches, $S_1$, $S_2$ and $S_3$, in a manner as is more fully described in U.S. Pat. No. 4,040,072, supra. The exposure control circuitry of FIG. 5 also includes a motor and solenoid control circuit 76 which operates in a manner as is more fully described in U.S. Pat. No. 4,040,072, supra. As is readily apparent, the motor and solenoid control circuit 76 operates to control the energizing current delivered to the solenoid 48 and to a motor 78. The film units intended for use with a camera of this invention are preferably of the self-developing type, and the motor 78 is provided to effect the advancement of processing of the self-developing film units in a well-known manner.

The photographic apparatus may also include an electronic flash or strobe (not shown) which is powered and fired in a manner as is fully described in U.S. Pat. No. 4,192,587, supra. The electronic flash (not shown) may be powered upon closure of a switch $S_4$ manually actuated by a button B whereupon the LED 28 is simultaneously powered by means not shown to provide an indication through the camera viewfinder that the strobe is being charged and not in a state of readiness for implementing a photographic exposure cycle as is fully described in U.S. Pat. No. 4,192,587, supra. When the strobe becomes fully charged in readiness for a photographic exposure cycle, the LED 28 is turned off by the same means not shown to provide a visual indication to the photographer of strobe charge readiness in a manner as is again fully described in U.S. Pat. No. 4,192,587, supra.

When the electronic flash is fully charged in the aforementioned manner, a photographer may initiate a photographic exposure cycle by manually actuating another button A so as to close the switch $S_1$ in a manner as is more fully described in U.S. Pat. No. 4,040,072, supra. Closure of the switch $S_1$, in turn, signals an exposure and sequencing circuit 80 in a manner as is fully disclosed in U.S. Pat. No. 4,192,587, supra, to provide a high (binary logic 1) solenoid drive signal along output line SDR to the motor and solenoid control circuit 76 so as to energize the solenoid 48 and retract the plunger 50 inwardly to rotate the walking beam 40 in a counterclockwise direction from its position as shown in FIG. 1 to its position as shown in FIG. 2. This limited counterclockwise movement of the walking beam 40 operates to effect the release of a latch mechanism (not shown) while simultaneously effecting the closure of the switches $S_2$ and $S_3$ in a manner as is again more fully described in U.S. Pat. No. 4,040,072, supra.

A high (binary logic 1) output signal from the exposure and sequencing circuit 80 along the output line SDR operates to clear an all-purpose counter 82 causing all the output signals therefrom to go to a low (binary logic 0) output signal level. The exposure and sequencing circuit also simultaneously energizes a relay 81 so as to close switch contacts $S_5$ and $S_7$ and open switch contact $S_6$ so as to preset the digital light integrator in the manner of this invention to be subsequently described herein. The high (binary logic 1) output signal along line SDR also provides a reset signal to the reset terminals of flip-flops 84 and 86, respectively, so as to cause the output signals from the Q terminals thereof to go to low (binary logic 0) levels while at the same time causing the output signals from the $\overline{Q}$ terminals thereof to go to high (binary logic 1) levels.

Closure of the switch $S_3$ also operates to provide a logic signal by way of the exposure and sequencing circuit 80 to power down the solenoid 48 from a high current energization condition required to retract the plunger 50 to a low current energization condition required to temporarily hold the plunger 50 in its retracted position as shown in FIG. 2. The powering down of the solenoid 48 to a holding current mode is accomplished in a manner as is fully described in U.S. Pat. No. 4,192,587, supra, and does not affect the assertive (binary logic 1) output signal level provided from the exposure and sequencing circuit 80 along the output line SDR. Under the aforementioned arrangement with the shutter blades in the position as shown in FIG. 2, scene light is blocked from impinging upon the photoresponsive element 62 which provides a dark current flow.

The output signal from the scene light detecting and integrating circuit 60 at output terminal 70 is directed to respective input terminals of a pair of comparators 92 and 94. The comparator 92 is set to trigger at a select reference voltage level $V_1$ and provides a low (binary logic 0) output signal level prior to the input signal level thereto reaching the reference voltage level $V_1$. When the input signal level to the comparator 92 reaches the reference voltage level $V_1$, the comparator 92 switches to provide a high (binary logic 1) output signal level to a latch circuit shown generally at 98. The comparator 94 provides a high (binary logic 1) output signal level prior to the input signal level thereto reaching another select reference voltage level $V_2$ which is higher than the reference voltage level $V_1$. The output signal level from the comparator 94 switches to a low (binary logic 0) output signal level upon the input signal thereto reaching the reference voltage level $V_2$.

The latch circuit 98 comprises two NAND gates 100 and 102 each of which has an input terminal thereto connected to the output terminal from the other NAND gate. The other input terminals to the NAND gates 100 and 102 connect, respectively, to the output terminals from the comparators 92 and 94. The output signal from the latch 98, in turn, is directed to a monostable multivibrator 118 which, in turn, inputs an integration counter 120. The output from the latch circuit 98 is also directed to the base terminal of a capacitor discharge control transistor 116 to provide a means for controlling the discharge of the capacitor 66 in a manner as will be subsequently described herein.

The output from the comparator 92 is also directed by way of the switch contact $S_5$ to input a current amplifier 104, the output of which is directed back to the input terminal 68 of the operational amplifier 64. The switch contact $S_5$ also simultaneously connects to a feedback resistor 96 which, in turn, connects to the reference voltage $V_1$ input terminal to the comparator 92. The input to the current amplifier 104 is directed to the base terminal of an NPN input gain transistor 106, the emitter terminal of which is connected to the base terminal of an NPN modulating transistor 110. The collector terminal of the transistor 106 is connected to a constant current source 108 which also provides a constant current flow to the collector terminal of an NPN current load transistor 114. The emitter terminal of the transistor 114 is grounded. The collector terminal of the modulating transistor 110 connects to another constant current source 107 which can provide a current output equal to or greater than the current source 108. The emitter terminal of the modulating transistor 110 is in common connection with respect to the output terminal from the current amplifier 104 and the collector terminal of an NPN current sink transistor 112. The emitter terminal of the transistor 112 is also grounded, and the base terminals of transistors 112 and 114 as well as the collector terminal of transistor 114 are in common connection with respect to each other and can be grounded by way of the switch contact $S_6$ when closed.

With the shutter blade elements in the position as shown in FIG. 2 and the switch contacts $S_5$, $S_7$ closed, and $S_6$ opened as previously described, the comparator 92 operates in the manner of an operational amplifier of the differential type since the resistor 96 is connected in a feedback arrangement between the input and output terminals thereof. Since the shutter blade elements 16 and 18 are in overlapping relationship with respect to the photoresponsive element 62, there is generally no output provided from the photoresponsive element 62 to the scene light integrating circuit 60 other than a small dark current flow. Thus, the output signal level from the light integrator circuit 60 at output terminal 70 is low in comparison to the reference voltage level $V_1$, and the output from the comparator 92 which is connected to operate in a differential amplifier mode will be sufficiently low to turn off the input gain transistor 106 and thereby turn off the modulating transistor 110.

Figure 6:
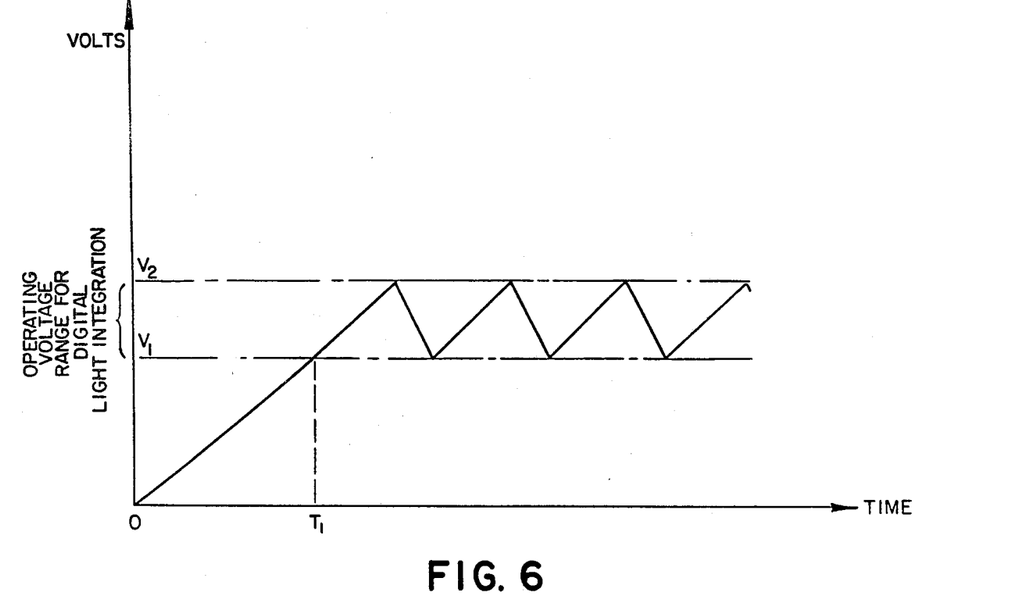
FIG. 6 is a graphical representation of the output signal level from the light integrating circuit in FIG. 5.

As now becomes readily apparent, the current sink transistor 112 which mirrors the current load transistor 114 conducts to provide a modulated current input to the integration circuit 60 thereby providing a rapidly ramping output voltage as shown at A in FIG. 6 to the comparator 92 connected to operate in a differential amplifier mode. As the rapidly ramping output voltage A from the integrator circuit 60 at the output terminal 70 approaches the reference voltage level $V_1$, the output signal level from the comparator 92 which is connected to operate in a differential amplifier mode increases so as to increase the input base drive current to the input gain transistor 106. As the transistor 106 begins to conduct current from the current source 108 away from the load transistor 114, there is a corresponding reduction in the current flow through the current sink transistor 112 which mirrors the current flow through the load transistor 114. During this time, the output signal from the latch 98 is rendered inoperative to either trigger the monostable multivibrator 118 or turn on the discharge control transistor 116 since the output signal therefrom is grounded by the closed switch contact $S_7$.

When the output signal level from the light integrator 60 at terminal 70 reaches the level of the reference voltage $V_1$, the input gain transistor 106 turns on so as to turn on the modulating transistor 110 and thereby reverse the direction of current flow to the input terminal 68 of the operational amplifier 64. This reversed current flow substantially matches and cancels the current flow through the photoresponsive element 62 so that the output signal level from the operational amplifier 64 at the output terminal 70 remains substantially constant and equal to the reference voltage level $V_1$.

Thus, in this manner the current amplifier 104 operates to preset the output from the light integrator circuit 60 at the reference voltage $V_1$ level prior to the incidence of illumination to the photoresponsive element 62 and prior to the commencement of the photographic exposure interval. The current amplifier 104 comprises a modulated current sink which provides a modulated current input to the integrator circuit 60 until the output from the integrator circuit 60 reaches the reference voltage $V_1$. Current amplifier 104 thereafter operates as a modulated current source to provide a substantially canceling current to the current flow through the photoresponsive element 62 so as to maintain the output voltage from the light integrator at the reference value $V_1$.

Figure 3:
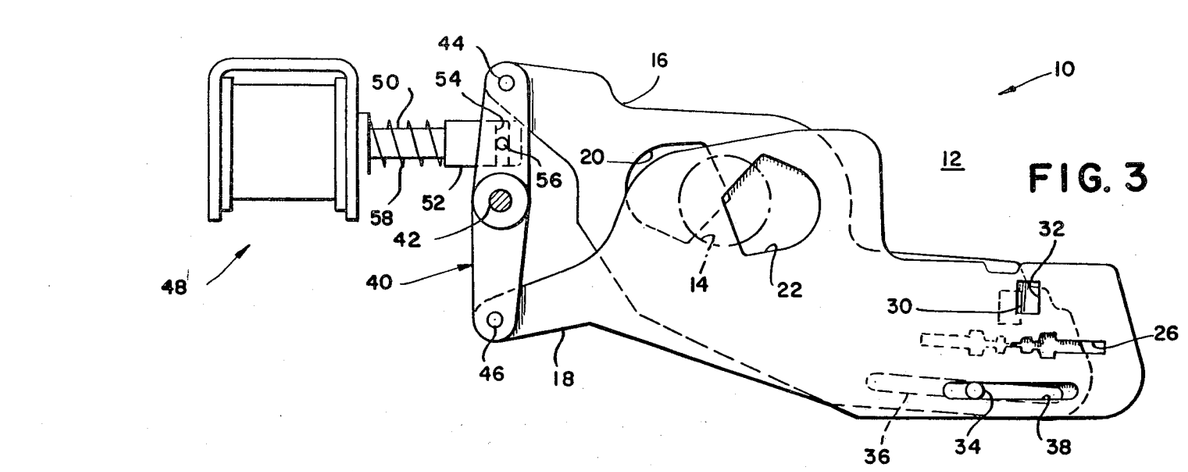
FIG. 3 is a front elevational view of the shutter blade mechanism of FIG. 1 at still another position from that of FIGS. 1 and 2.

The motor and solenoid control circuit 76 is thereafter signaled in a manner as is more fully described in U.S. Pat. No. 4,192,587, supra, to deenergize the solenoid 48 and release the shutter blade elements 16 and 18 to move towards the position as shown in FIG. 3 to commence an exposure interval. The exposure and sequencing circuit 76 provides in synchronism with the deenergization of the solenoid 48 a low (binary logic 0) output signal level along line SDR so as to remove the clear signal from the all-purpose counter 82 so as to enable it to begin counting a clock pulse from a clock 83. In this manner, the all-purpose counter 82 is synchronized to start counting generally in correspondence with the initial movement of the shutter blades 16 and 18 from the position as shown in FIG. 2 toward the position as shown in FIGS. 3 and 4.

Approximately 18 milliseconds subsequent to the deenergization of the solenoid 48, a decode signal is provided from the all-purpose counter by an AND gate 122 which switches to provide an assertive (binary logic 1) output signal level to set the flip-flop 84. The flip-flop 84, in turn, switches to provide an assertive (binary logic 1) output signal level from terminal Q to enable the integration counter 120 and at the same time to provide an assertive (binary logic 1) output signal level to one input terminal of an AND gate 88. The other input terminal to the AND gate 88 is already at a (binary logic 1) output signal level by virtue of the output received from the $\overline{Q}$ terminal of flip-flop 86. Thus, the AND gate 88 switches to provide a high (binary logic 1) to the base terminal of an NPN transistor 126 so as to drive the transistor 126 into saturation and thereby energize the LED 28. In this manner, the LED 28 is energized immediately prior to the shutter blade elements 16 and 18 reaching the position as shown in FIG. 3 where the exposure interval commences and the scene light is first admitted to the film plane. As is readily apparent, the primary apertures 20 and 22 just begin to overlap to admit scene light to the film plane at the same time that the photocell sweep secondary apertures 24 and 26 begin to overlap to admit scene light to the photoresponsive element 62. The assertive (binary logic 1) output signal level from the Q terminal of the flip-flop 84 also signals the exposure and sequencing circuit 80 to deenergize the relay 81 thereby opening the switch contacts $S_5$, $S_7$ and closing the switch contact $S_6$ so as to simultaneously disable the influence of the presetting current amplifier 104, enable the output terminal from the latch 98, and disconnect the feedback resistor 96 from its connection between the input and output of the comparator 92 thereby enabling the comparator 92 to operate in the mode of a comparator.

First light detect apertures 30 and 32 thereafter begin to overlap to admit artificial light from the LED 28 to the photoresponsive element 62 in synchronism with the first light admitted by the primary apertures 20 and 22 to the film plane. The light detecting and integrating circuit 60 detects and integrates the artificial light from the LED to provide a sawtooth portion of the output signal between the reference voltages $V_1$ and $V_2$ as shown in FIG. 6.

Figure 7:
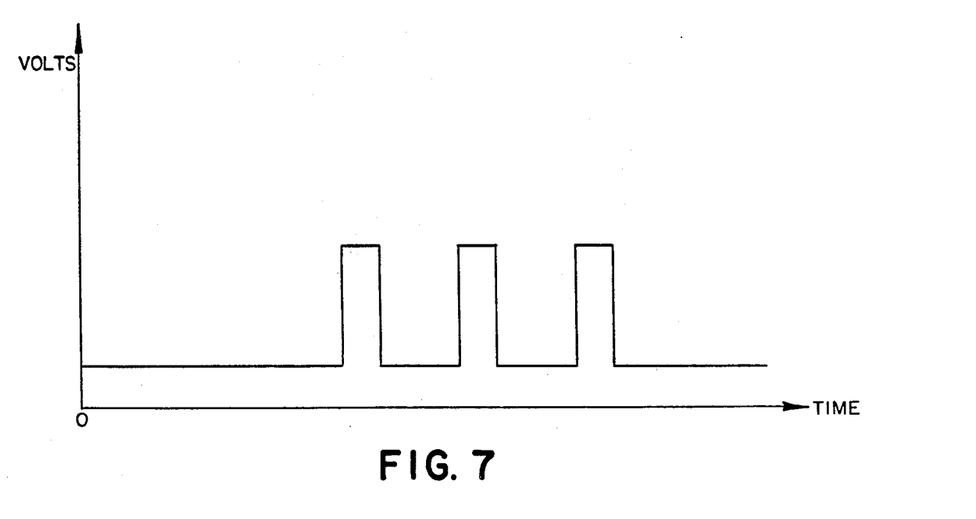
FIG. 7 is a graphical representation of the output signal wave form from the monostable circuit in FIG. 5.

As previously discussed, the instant that the LED 62 first receives illumination from the LED 28 at the commencement of the exposure interval, the output signal level from the integrator 60 at output terminal 70 is equal to the reference voltage $V_1$ as a result of the aforementioned presetting operation and thereafter starts to ramp upward from the initial $V_1$ reference voltage value. As the output signal level from the integrator 60 ramps upward from the $V_1$ reference voltage level towards the $V_2$ reference voltage level, the output from the comparator 92 is at a high (binary logic 1) output reference level and the output signal level from the comparator 94 is also at a high (binary logic 1) output signal level so as to provide a low (binary logic 0) output signal level from the latch 98. When the output signal level from the integrator 60 at output terminal 70 ramps upward to the reference voltage $V_2$ level, the comparator 94 switches to provide a low (binary logic 0) input signal level to the NAND gate 102 thereby switching the latch 98 to provide a high (binary logic 1) output signal level to trigger the monostable multivibrator 118 while at the same time providing a base drive current to the capacitor discharge control transistor 116. The monostable multivibrator 118, in turn, provides a pulse of predetermined duration which is counted by the integration counter 120. Turning on the transistor 116 operates to discharge the integration capacitor 66 so as to cause the output voltage from the integrator 60 at output terminal 70 to ramp downward from the voltage reference level $V_2$ back toward the voltage reference $V_1$ as shown in FIG. 6. Thus, the output signal level from the integrating circuit 60 discharges back to the reference voltage $V_1$ so as to switch the latch 98 back to its original low (binary logic 0) output signal level thereby, in turn, turning off the capacitor discharge transistor 116. Turning off the transistor 116, in turn, allows the integration circuit 60 to resume integrating back to the reference signal voltage $V_2$ as previously discussed. The light integrating circuit 60, comparators 92 and 94 and latch 98 continue to cycle in the aforementioned manner between the selected reference voltage levels $V_1$ and $V_2$ to provide the sawtooth output signal as shown in FIG. 6. Thus, the reference voltage levels $V_1$ and $V_2$ define the limits of the operative range of voltages between which the output signal from the light integrator cycles. The output signal from the monostable multivibrator 118, in turn, approximates a pulse train as shown in FIG. 7 whereupon the pulses are subsequently counted by the integration counter to ultimately provide the requisite exposure control command signals based upon the total number of pulses counted.

The integration counter 120 is thereafter decoded upon reaching a preferred pulse count of 3 by the AND gate 124 being switched to provide a positive (binary logic 1) output signal to the set terminal of flip-flop terminal 86. The output signal level at terminal Q from flip-flop 86 is thereby switched to an assertive (binary logic 1) output signal level to control a subsequent exposure influencing operation such as the initiation of flash fire in a manner as is fully disclosed in U.S. Pat. No. 4,192,587, supra. The output signal from terminal Q of flip-flop 86 also simultaneously switches to a low (binary logic 0) output signal level to switch the AND gate 88 to provide a low (binary logic 0) output signal level to, in turn, switch off the transistor 126 and deenergize the LED 28. The shutter blade elements continue to move toward the maximum aperture defining position as shown in FIG. 4 with the exposure and flash fire control being provided in a manner as is again fully described in U.S. Pat. No. 4,192,587, supra. The integration counter 120 may also be subsequently decoded at a substantially higher pulse count by another AND gate 128 which can provide an assertive (binary logic 1) input signal level to the exposure and sequence circuit 80 to effect the reenergization of the solenoid 48 and thereby terminate the exposure in a well-known manner.

As is now readily apparent from referring to FIG. 6, the initial lead time for the output signal from the light integrator circuit 60 to ramp up to the first reference voltage level $V_1$ is significant and may even be in the order of 30–40 milliseconds. This long lead time is not accounted for by the integration counter 120 and could otherwise introduce an intolerable error to any subsequent exposure control and, in particular, to the aforementioned detection of the initial scene light admission to the film plane which is crucial to ultimately determining the exact instant of strobe fire during the exposure interval as is fully described in U.S. Pat. No. 4,192,587, supra. Thus, the presetting features of this invention assure that the scene light integration commences after the output signal level from the light integrator is at the lower reference voltage level $V_1$ so as to assure an immediate counting of output pulses by the integration counter 120 without having to wait for the integration circuit 60 to initially charge up to the $V_1$ voltage level. Thus, any potential errors which would otherwise result from this integration lead time required to charge the light integrating circuit 60 to the minimum reference voltage $V_1$ become minimized without having to turn on the LED 20 to prebias the photoresponsive element 62 as was heretofore required. Thus, subsequent exposure operations such as the firing of the flash which requires an extremely accurate determination of the commencement of the exposure interval may be provided with substantially no error which might otherwise result if the output voltage from the scene light integrator 60 were below the reference voltage level $V_1$ at the instant of first light.

Although the invention has been described primarily in relation to enabling the precise detection of the instant at which light is first admitted to the film plane at the start of the exposure interval, it will be readily understood that presetting the digital light integrator in the manner of this invention also allows other subsequently made scene light related measurements, such as the pre-exposure ambient scene light measurement as described in U.S. Pat. No. 4,192,587, supra, to be more accurate and precise.

Other embodiments of the invention, including additions, subtractions, deletions and other modifications of the preferred disclosed embodiments of the invention will be obvious to those skilled in the art and are within the scope of the following claims.

What is claimed is:

1. A radiant energy detecting and integrating circuit comprising:
   detecting means responsive to incident radiance for providing an output signal having an electrical characteristic which varies as a function of the intensity of incident radiation thereon;
   means for integrating said output signal from said detecting means and providing an output signal which progressively increases in correspondence with the integrated value of said output signal from said detecting means; and
   selectively actuatable preset means for providing an input signal to said integrating means prior to the incidence of radiation to said detecting means in order to enable said integrating means to provide a progressively increasing output signal, said preset means thereafter responding to said progressively increasing output signal from said integrating means reaching a select value for changing its said input signal to said integrating means so as to maintain said output signal from said integrating means at substantially said select value until radiation is incident to said detecting means.

2. The circuit of claim 1 wherein said preset means comprises a current amplifier.

3. The circuit of claim 2 wherein said current amplifier includes a modulated current sink and wherein said input signal to said integrating means from said preset means prior to said output signal from said integrating means reaching said select value generally corresponds to the current drawn by said current sink.

4. The circuit of claim 3 wherein said detecting means comprises a photoresponsive element having a current flow therethrough and wherein said current amplifier includes a modulated current source for providing a substantially canceling current to said current flow through said photoresponsive element subsequent to said output signal from said integrating means reaching said select value.

5. The circuit of claim 4 wherein selectively actuatable preset means includes selectively actuatable switch means for facilitating the energization of said preset means current amplifier.

6. A digital light detection and integration circuit comprising:
   detecting means responsive to incident illumination for providing an output signal having an electrical characteristic which varies as a function of the intensity of incident illumination;
   means for integrating said output signal from said detecting means and providing an output signal which progressively increases in correspondence with the integrated value of said output signal from said detecting means, said integrating means including an integration capacitor for receiving charging current during said integration;
   comparator means for comparing the level of said output signal from said integrating means with one select reference signal level and switching from a first select output signal level to a second select output signal level when the output signal level from said integrating means reaches said select reference signal level;
   means for discharging said integration capacitor in response to said comparator means switching to its said second select signal level until the level of said output signal from said integration means discharges to a selected value below said select reference signal thereby switching said comparator means output signal level back to its said first select level to disable said discharge means from further discharging said integration capacitor and resuming integration by recharging said integration capacitor;
   means for counting the number of times said comparator switches from its said first select output signal level to its said second select output signal level; and
   selectively actuatable preset means for providing an input signal to said integrating means prior to the incidence of light to said detecting means in order to enable said integrating means to provide a progressively increasing output signal, said preset means thereafter responding to said progressively increasing output signal from said integrating means reaching said selected value below said select reference signal for changing its said input signal to said integrating means so as to maintain said output signal from said integrating means at substantially said selected value below said select reference signal.

7. The circuit of claim 6 wherein said comparator means includes: a first comparator responsive to the output signal from said integrating means reaching said one select reference signal level for switching its output from a first select signal to a second select signal and for thereafter switching its output back to its said first select signal upon the output signal from said integrating means decreasing below said one select reference signal level, a second comparator responsive to the output signal from said integrating means reaching another select reference signal level equal to said selected value below said one select reference signal level for switching its output from a first select signal to a second select signal and for thereafter switching its output back to its said first select signal upon the output signal from said integrating means decreasing below said other select reference signal level, and latch means responsive to said output from said first comparator switching to its said second select signal in response to the output signal from said integrating means increasing to said one select reference signal level for providing said second select output signal level from said comparator means and further responsive to said output from said second comparator switching back to its said first select signal in response to the output signal from said integrating means decreasing below said other select reference signal level for providing said first select output signal level from said comparator means.

8. The circuit of claim 7 wherein said preset means comprises a current amplifier.

9. The circuit of claim 8 wherein said current amplifier includes a modulated current sink and wherein said input signal to said integrating means from said preset means prior to said output signal from said integrating means reaching said other select reference signal level generally corresponds to the current drawn by said current sink.

10. The circuit of claim 9 wherein said detecting means comprises a photoresponsive element having a current flow therethrough and wherein said current amplifier includes a modulated current source for providing a substantially canceling current to said current flow through said photoresponsive element subsequent to said output signal from said integrating means reaching said other select reference signal level.

11. The circuit of claim 10 including a feedback resistor wherein said preset means includes selectively actuatable switch means for facilitating the energization of said preset means current amplifier, for disabling the output signal from said first comparator and for facilitating the connection of said feedback resistor between the input and output of said second comparator such that said second comparator operates as a differential amplifier.

12. A photographic camera apparatus of the type adapted to be energized at least in part by a source of electrical energy and including means for defining a film plane comprising:
a photoresponsive element stationed to receive light from the scene to be photographed to provide an output signal having an electrical characteristic which varies as a function of the intensity of scene light incident thereon;
means for integrating said output signal from said photoresponsive element and providing an output signal which progressively increases in correspondence with the integrated value of said output signal from said photoresponsive element so as to ultimately control at least one exposure influencing event;
selectively actuatable shutter means for controlling the admission of scene light to the film plane to define an exposure interval and for controlling the admission of scene light to said photoresponsive element to generally correspond with said exposure interval; and preset means responsive to the actuation of said shutter means for providing an input signal to said integrating means prior to the commencement of said exposure interval and the admission of scene light to said photoresponsive element in order to enable said integrating means to provide a progressively increasing output signal, said preset means thereafter responding to said progressively increasing output signal from said integrating means reaching a select value for changing its said output signal to said integrating means so as to maintain said output signal from said integrating means at substantially said select value until the commencement of said exposure interval.

13. The camera apparatus of claim 12 wherein said preset means comprises a current amplifier.

14. The camera apparatus of claim 13 wherein said current amplifier includes a modulated current sink and wherein said input signal to said integrating means from said preset means prior to said output signal from said integrating means reaching said select value generally corresponds to the current drawn by said current sink.

15. The camera apparatus of claim 14 wherein said photoresponsive element has a current flow therethrough and wherein said current amplifier includes a modulated current source for providing a substantially canceling current to said current flow through said photoresponsive element subsequent to said output signal from said integration means reaching said select value.

16. The camera apparatus of claim 15 including means for providing a signal to disable said preset means from providing its said input signal to said integrating means prior to the commencement of said exposure interval.

17. A photographic camera apparatus of the type adapted to be energized at least in part by a source of electrical energy and including means for defining a film plane comprising:
a photoresponsive element stationed to receive light from the scene to be photographed to provide an output signal having an electrical characteristic which varies as a function of the intensity of scene light incident thereon;
means for integrating said output signal from said photoresponsive element and providing an output signal which progressively increases in correspondence with the integrated value of said output signal from said photoresponsive element, said integrating means including an integration capacitor for receiving charging current during said integration;
comparator means for comparing the level of said output signal from said integrating means with one select reference signal level and switching from a first select output signal level to a second select output signal level when the output signal level from said integrating means reaches said select reference signal level;
means for discharging said integration capacitor in response to said comparator means switching to its said second select signal level until the level of said output signal from said integration means discharges to a selected value below said select reference signal thereby switching said comparator means output signal level back to its said first select level to disable said discharge means from further discharging said integration capacitor and resuming integration by recharging said integration capacitor;

means for counting the number of times said comparator switches from its said first select output signal to its said second select output signal level so as to ultimately control at least one exposure influencing event as a function of said count;

selectively actuatable shutter means for controlling the admission of scene light to the film plane to define an exposure interval and for controlling the admission of scene light to said photoresponsive element to generally correspond with said exposure interval; and preset means responsive to the actuation of said shutter means for providing an input signal to said integrating means prior to the commencement of said exposure interval and the admission of scene light to said photoresponsive element in order to enable said integrating means to provide a progressively increasing output signal, said preset means thereafter responding to said progressively increasing output signal from said integrating means reaching said selected value below said select reference signal for changing its said input signal to said integrating means so as to maintain said output signal from said integrating means at substantially said selected value below said select reference signal.

18. The camera apparatus of claim 17 wherein said comparator means includes: a first comparator responsive to the output signal from said integrating means reaching said one select reference signal level for switching its output from a first select signal to a second select signal, and for thereafter switching its output signal back to its said first select signal upon the output signal from said integrating means decreasing below said one select reference signal level, a second comparator responsive to the output signal from said integrating means reaching another select reference signal level equal to said selected value below said one select reference signal level for switching its output from a first select signal to a second select signal and for thereafter switching its output back to its first said select signal upon the output signal from said integrating means decreasing below said other select reference signal level, and latch means responsive to said output from said first comparator switching to its said second select signal in response to the output signal from said integrating means increasing to said one select reference signal level for providing said second select output signal level from said comparator means and further responsive to said output from said second comparator switching back to its said first select signal in response to the output signal from said integrating means decreasing below said other select reference signal level for providing said first select output signal level from said comparator means.

19. The camera apparatus of claim 18 wherein said preset means comprises a current amplifier.

20. The camera apparatus of claim 19 wherein said current amplifier includes a modulated current sink and wherein said output signal to said integrating means from said preset means prior to said output signal from said integrating means reaching said other select reference signal level generally corresponds to the current drawn by said current sink.

21. The camera apparatus of claim 20 wherein said photoresponsive element has a current flow therethrough and wherein said current amplifier includes a modulated current source for providing a substantially canceling current to said current flow through said photoresponsive element subsequent to said output signal from said integrating means reaching said other select reference signal level.

22. The camera apparatus of claim 21 including a feedback resistor wherein said preset means includes switch means responsive to the actuation of said shutter means for facilitating the actuation of said preset means current amplifier, for disabling the output signal from said first comparator, and for facilitating the connection of said feedback resistor between the input and output of said second comparator such that said second comparator operates as a differential amplifier, said switch means responding prior to the commencement of the exposure interval for disabling the energization of said preset means current amplifier, reenabling the output signal from said first comparator and disconnecting the connection of said feedback resistor between said input and output of said second comparator.

* * * * *